United States Patent Office.

A. J. CARVER AND E. P. HORN, OF GREENHILL, TENNESSEE.

Letters Patent No. 82,205, dated September 15, 1868.

IMPROVED HOG-CHOLERA MEDICINE.

The Schedule referred to in these Letters Patent and making part of the same.

TO ALL WHOM IT MAY CONCERN:

Be it known that we, A. J. CARVER and E. P. HORN, of Greenhill, in the county of Wilson, in the State of Tennessee, have invented and discovered a new remedy for the cure and prevention of the disease known as hog-cholera, to be called "Carver's and Horn's Hog-Cholera Remedy;" and we do hereby declare that the following is a full and exact description thereof, reference being had to the accompanying letter.

The nature of our invention and discovery consists in relieving the impacted, inflamed, and congested stomach and bowels by giving to the hog the remedy; and, in general, we compose this remedy of equal parts of May-apple root, or *Podophyllum*, rhubarb, and columba, or two parts of May-apple root and one of columba.

What we claim as our invention and discovery, and desire to secure by Letters Patent, is—

The aforesaid medicinal compound for the cure and prevention of hog-cholera.

A. J. CARVER,
E. P. HORN.

Witnesses:
T. L. ROBERTSON,
W. B. WINFERD.